G. W. DEATRICH, Sr.
VEHICLE TIRE.
APPLICATION FILED JAN. 16, 1914. RENEWED AUG. 25, 1917.
1,260,155.
Patented Mar. 19, 1918.
2 SHEETS—SHEET 1.
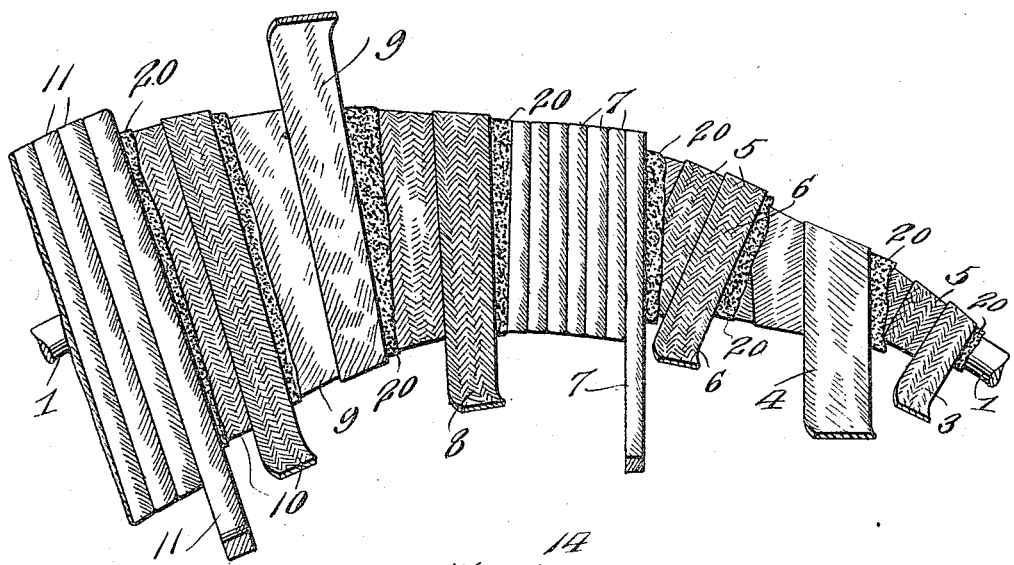
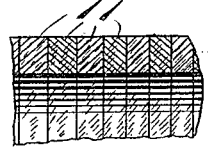
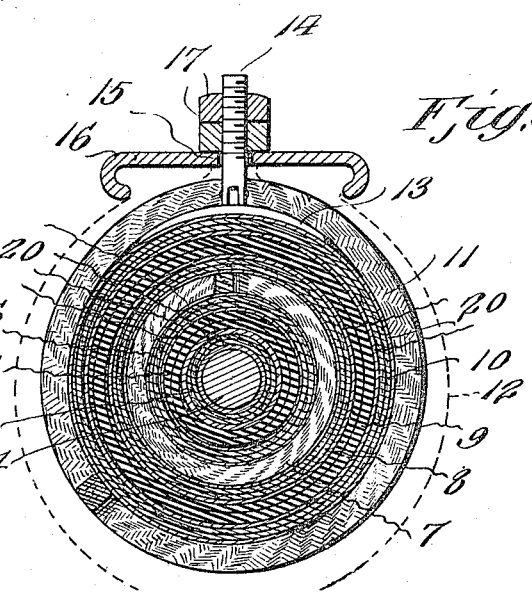
Inventor
George W. Deatrich, Sr.
By Victor J. Evans
Attorney
Witnesses
Frank Hough

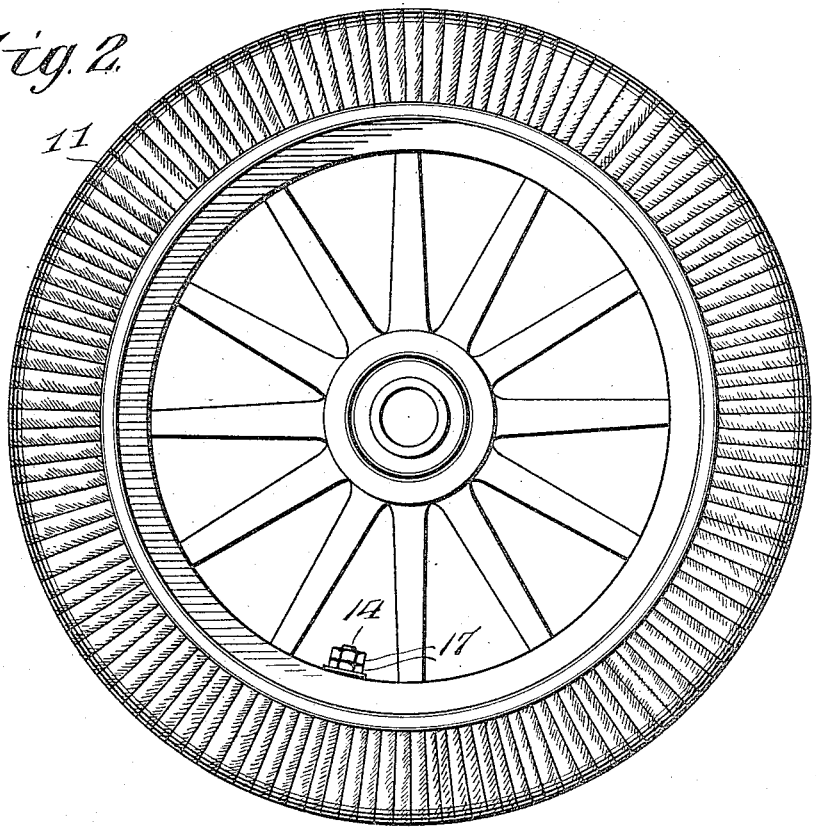
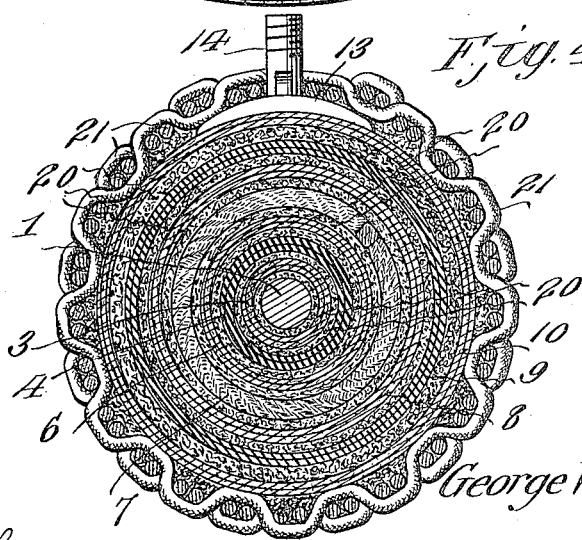

UNITED STATES PATENT OFFICE.

GEORGE W. DEATRICH, SR., OF POTTSVILLE, PENNSYLVANIA.

VEHICLE-TIRE.

1,260,155.        Specification of Letters Patent.        Patented Mar. 19, 1918.

Application filed January 16, 1914, Serial No. 812,502. Renewed August 25, 1917. Serial No. 188,187.

*To all whom it may concern:*

Be it known that I, GEORGE W. DEATRICH, Sr., a citizen of the United States, residing at Pottsville, in the county of Schuylkill and State of Pennsylvania, have invented new and useful Improvements in Vehicle-Tires, of which the following is a specification.

This invention relates to vehicle tires; and it has for its objects the provision of a structure of this character which will be particularly adapted for use upon the wheels of automobiles, carriages, wagons, bicycles, or the like; one which may be used as a substitute for the present form of pneumatic tire and which will consist of parts that will effectually absorb the shocks and jars that are transmitted thereto; and one which will be strong and durable and inexpensive in construction, and one which will possess a high degree of elasticity with the use of a minimum quantity of rubber.

Another object of the invention is the provision of a tire structure which will be constructed of parts that may be operatively assembled with one another without requiring the use of forming cores or the like.

A still further object of the invention is the provision of a tire structure of the character described which may be quickly connected with the rim of an ordinary vehicle without requiring changes in the construction thereof.

Another object of the invention is the provision of a tire structure wherein the different units or constituents thereof are alternately of varying degrees of elasticity and which are arranged with such regard to their natural qualities as to reduce the possibility of their being decomposed within a desirable period of time.

Another object of the invention is the provision of a tire structure which may be used as a filler within the outer casing of an ordinary pneumatic tire if desired.

With these and other objects in view, the invention consists of certain novel features of construction, combination and arrangement of parts, as will be hereinafter described and claimed.

In the accompanying drawings:—

Figure 1 is a side view of a portion of a tire, showing portions thereof in different stages of completion;

Fig. 2 is a side view of a wheel, showing the application of the tire thereto;

Fig. 3 is a transverse section through the tire;

Fig. 4 is a view similar to Fig. 3, showing a slightly modified form of the invention;

Fig. 5 is a section through a slightly modified form of core;

Fig. 6 is a section through portions of several windings or convolutions of the tread member of the tire.

With reference to the form of the invention shown in Figs. 1, 2, 3 and 6, it is described that the tire consists of a core 1, which may be solid in cross section as shown in Fig. 3 or hollow in cross section as shown at 2 in Fig. 5. The core may be formed of a single strip of material and the terminals of the strip may be welded or secured together in any obvious well known fashion.

Around the core is wound a tape 3 of canvas, while wound spirally around the tape 3 is a similar, but slightly wider, tape 4 of rubber. The convolutions or windings of the different tapes 3 and 4 overlap each other for a distance sufficient to cause the core 1 to be thoroughly and uniformly covered throughout its length and incident to such overlapping of the mentioned convolutions of the tapes spaces such as shown at 5 are formed as shown in Fig. 1. In this manner it is evident that when one tape is wound around another the tape 4 will permit of a greater degree of elasticity than would be presented if the windings of each tape were not overlapped so as to present the interposed or intervening spaces 5 between the adjacent tapes. This arrangement of employing tapes is carried out throughout the entire formation of the tire and it will only be briefly named that around the tape 4 is spirally wound a canvas tape 6 while around the latter is a winding of cord or rope 7. The windings of the cord or rope 7 do not overlap so that the diameter of the tire becomes uniform throughout after the first wrappings 3, 4 and 6 described. The windings of the rope 7 are closely associated with one another and they are embraced by a canvas tape 8 having a width which slightly exceeds the width of the rope 7, so that the joints between the windings of the latter are properly overlapped by adjacent windings of the tape 8.

This arrangement is preferred in order that the windings of the rope 7 will be held or maintained in approximately the same relative positions at all times. The rope 7 has a square cross sectional diameter so that its windings may be snugly associated with each other.

Around the tape 8 is arranged a spirally wound tape 9 of rubber, while around the latter is a spirally wound tape of canvas 10 and then around the windings of the tape 10 is a rope tread 11. The rope 11 has a shape corresponding with that of the rope 7 and the windings of the latter are associated with each other so that the tread or outer surface of the tire is substantially of an uninterrupted nature, as will be understood.

Through the arrangement specified the materials are alternately of different degrees of elasticity or springiness, and by arranging the materials in the precise manner mentioned the tire is of a uniform texture throughout and the different constituents thereof serve to prevent the tire from being unduly decomposed through being subjected to the elements. The core 1 also contributes to the general elasticity of the tire and its specific association with the parts 3, 4, 6, 7, 8, 9, 10 and 11 permits the shocks and jars to be gradually but effectually absorbed.

While the tire structure is intended to be used without the ordinary outer casing I wish it to be understood that from practice it is found to possess a high degree of usefulness when employed in this manner, and on reference to Fig. 3 it is seen that the whole of the structure hereinbefore specifically described is mounted within an ordinary outer casing 12, while interposed between the materials 10 and 11 is a resilient ring 13 having a threaded lug 14 which is extended through the valve stem opening 15 of the rim 16. One or more retaining nuts 17 may be connected to the lug 14 to confine the tire against creeping around the rim. Cement 20 may be interposed between the different windings of materials employed and it is preferred that in the cement be mixed a suitable proportion of granulated pulp, sawdust or the equivalent thereof. By mixing the cement with such material it may be more effectually spread and the elasticity of the structure is somewhat added to.

In the form of the invention shown in Fig. 4 the identical units of the structure specifically employed in Fig. 1 are used excepting the outer tread member or rope 11, and in this instance I employ an outer member 21 having interwoven strands that are arranged so as to present a comparatively rough antiskid tread.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

I claim:—

A structure of the class described comprising a core, a series of layers of spirally wound wrappers around said core, the adjacent turns of each winding overlapping each other, said wrappers respectively being of different degrees of elasticity alternately, a rope of square cross section wound spirally upon said wrappers, the convolutions being closely associated so as to provide an uninterrupted surface, and cement interposed between the different layers of wrappers.

In testimony whereof I affix my signature in presence of two witnesses.

GEORGE W. DEATRICH, Sr.

Witnesses:
JAMES A. KOEHL,
BENNETT S. JONES.

Copies of this patent may be obtained for five cents each, by addressing the "Commissioner of Patents, Washington, D. C."